3,421,854
MANUFACTURE OF NITROGEN TETROXIDE
Joseph A. Smith, Richmond, and Richard E. Formaini, Colonial Heights, Va., assignors to Allied Chemical Corporation, New York, N.Y., a corporation of New York
Filed Aug. 15, 1963, Ser. No. 302,399
U.S. Cl. 23—162      2 Claims
Int. Cl. C01b 21/20

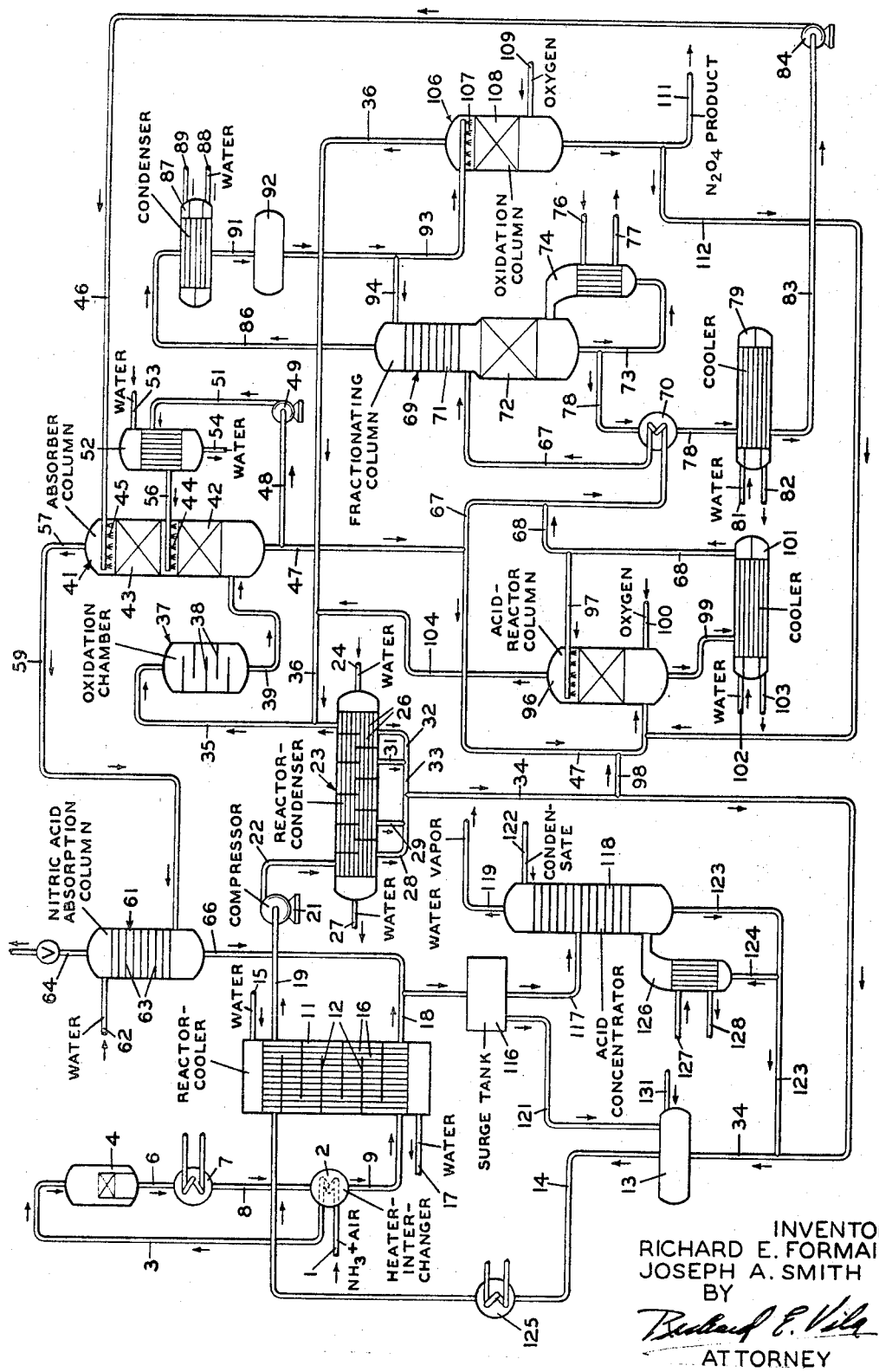

---

ABSTRACT OF THE DISCLOSURE

Nitrogen tetroxide is prepared, without production of by-product nitric acid, from a gas obtained by the high temperature combustive oxidation of a nitrogen containing gas, such as by the catalytic oxidation of ammonia which results in a gas mixture that includes nitric oxide and nitrogen dioxide. The latter gas mixture is converted to nitrogen tetroxide by integrating the stages of the process which includes treatment with oxygen and with nitric acid of predetermined concentration produced during the course of the operation, the concentration being differentiated at respective stages. By appropriately recycling and correlating nitric acid of differing concentrations, produced at several stages, for effecting the treatment of the gases with nitric acid of the desired concentration, and by recycling a portion of the nitrogen tetroxide product for admixture with concentrated nitric acid utilized at a designated stage of the operation, which is effected under regulated conditions of temperature as well as pressure, nitrogen tetroxide is prepared without the by-product production of nitric acid.

---

This invention relates to manufacture of nitrogen tetroxide and more particularly to a new and improved process for producing nitrogen tetroxide without production of by-product nitric acid. In its more preferred aspects the invention also relates to an integrated nitrogen tetroxide plant which may be operated on an independent, self-contained basis to produce high purity nitrogen tetroxide or into which nitric acid may be added and consumed to increase production of nitrogen tetroxide.

Nitrogen tetroxide is also known as dinitrogen tetroxide ($N_2O_4$) in the liquid phase and generally as nitgogen dioxide ($NO_2$) in the gas phase. It has broad utility as an oxidizing or nitrating agent and is also commonly employed in bleaching and as a diazotizing agent. More recently it has become important as an oxidizer for rocket fuels.

The manufacture of nitrogen tetroxide as carried out by the industry starts with the high temperature combustive oxidation of nitrogen-containing gas such as ammonia to provide a gas stream which generally contains primarily nitrogen and lesser amounts of nitric oxide (NO), nitrogen dioxide, oxygen, and water vapor. In the conventional nitrogen tetroxide processes the gas stream is first subjected to cooling to condense and remove water vapor and then to oxidation, commonly in the presence of dilute nitric acid, whereby the nitrogen dioxide content of the gas is materially increased by oxidation of the nitric oxide. The resulting gas stream is then passed in countercurrent flow with concentrated nitric acid to remove the gaseous nitrogen dioxide from the gas stream by absorption in the nitric acid. From the absorption operation the concentrated acid with absorbed nitrogen dioxide is fractionated to liberate the nitrogen dioxide which is thereafter condensed to liquid nitrogen tetroxide for recovery.

Nitrogen tetroxide manufacture has been long practiced and would appear to be a relatively simple matter such as to be subject to a high degree of efficiency and flexibility in operation. However, the fact is that nitrogen tetroxide manufacture as carried out by the industry has been inefficient and so much so that it is dependent on operation in conjunction with a nitric acid plant in order to be even economically feasible. The several reasons for this situation are largely explained in terms of certain undesired but inherent characteristics of the conventional nitrogen tetroxide processes. A major consideration underlying this situation is the fact that the conventional nitrogen tetroxide process produces considerable amounts of by-product nitric acid. For example, during the absorption step in which nitrogen dioxide is taken up by concentrated nitric acid and separated from the gas processing stream an unavoidable amount of nitric acid is usually formed which must be eventually removed from the process to prevent build-up of this material. The presence of undesired amount of uncondensed water vapor in the gas stream is a major factor contributing to the formation of the nitric acid during the absorption step. Also, in the initial cooling of the ammonia oxidation gas to condense and remove water vapor substantial amounts of nitric acid are formed by chemical combination of the water vapor with nitrogen dioxide in the gas. Not only does this increase the net production of undesired nitric acid by-product but also substantially reduces the nitrogen dioxide content of the gas available for eventual recovery as nitrogen tetroxide. Moreover, the nitric acid produced during condensation is of low concentration of the order of about 15-35% strength and is of little practical value even as nitric acid unless subsequently upgraded. Another consideration leading to the operation of nitrogen tetroxide manufacture in conjunction with nitric acid production lies in the fact that gas streams which are to be vented from the nitrogen tetroxide process contain significant amounts of the oxides of nitrogen. Utilization of these oxides of nitrogen is of economic importance and therefore it has been conventional to also send these vented streams to the nitric acid plant. For example, in the absorption step the processing gas stream usually contains significant amounts of unoxidized nitric oxide which is difficult to absorb and utilize in the concentrated nitric acid absorption medium. The presence of unabsorbed nitric oxide at this point therefore in some respects is a measure of process inefficiency. The nitrogen dioxide content of the gas is also never completely absorbed and the overall inefficiency of the absorption operation represented by off-gases containing nitric oxide and nitrogen dioxide is at least partially compensated for by sending these gases to the nitric acid plant for utilization.

The need for an improved process for nitrogen tetroxide manufacture capable of high yields has become of even greater significance because of the increased importance of nitrogen tetroxide. Similarly, there has been a need for an efficient process capable of operating without by-product nitric acid production and independent of the nitric acid plant. The availability of an integrated self-contained nitrogen tetroxide plant is not only important commercially for location where nitric acid production would be uneconomical but it is also desired in special situations. For example, when the nitrogen tetroxide is to be used as an oxidizer for rockets fuel it would be desirable to have a plant at the rocket launching site thereby making the material readily available. Clearly, a plant which produces substantial amounts of by-product nitric acid is unattractive for use in such situations.

An object of the present invention is to provide a new and improved process for manufacture of nitrogen tetroxide. Another object of the invention is to provide a process by which nitrogen dioxide may be produced without production of by-product nitric acid. Another object is to provide a nitrogen tetroxide process operating without by-product nitric acid production to efficiently produce nitrogen tetroxide in high yield based on nitrogen oxide content of the original oxidation gas stream being processed to produce nitrogen tetroxide. Another object of the invention is to provide an improved nitrogen tetroxide process in which the practical necessity of sending spent gas streams from the process to a nitric acid plant is eliminated. A further object of the invention is to provide an integrated nitrogen tetroxide plant operating on a self-contained basis to produce nitrogen tetroxide without by-product nitric acid and independent of a nitric acid plant. A still further object of the invention is to provide an integrated nitrogen tetroxide plant not only operating to produce nitrogen tetroxide on a continuous basis without net by-product nitric acid production but also a plant which may, if desired, be operated to consume nitric acid and thereby increase production of nitrogen tetroxide.

The invention will be described in detail with reference to the accompanying drawing which is a diagrammatic flow sheet illustrating a preferred nitrogen tetroxide plant for producing high purity nitrogen tetroxide in high yield on an integrated basis and without net production of by-product nitric acid.

Referring to the drawing, ammonia gas is admixed with air in line 1 and the mixture fed through heater-interchanger 2 to preheat the gas to a temperature of about 100–200° C. The preheated mixture of ammonia and air is then fed through line 3 and introduced into catalytic oxidizer 4 where the ammonia gas is subjected to high temperature combustive oxidation. The oxidation of ammonia or other nitrogen-containing gases to produce gas streams from which nitrogen tetroxide may be produced is well known. Ammonia oxidation in the air or other oxygen-containing gas is generally carried out at a temperature of about 800–960° C. and in the presence of a catalyst, e.g. cobalt, cobalt-nickel or platinum-rhodium. Oxidation may be at atmospheric or at superatmospheric pressure up to 100 p.s.i.g. and even higher. The cobalt catalysts are used generally for low pressure oxidation, for example at 4–22 p.s.i.g. and the platinum-rhodium catalyst used generally for high pressure oxidation, for example 85–100 p.s.i.g. Generally, low pressure oxidation is conducted at temperatures of 800–830° C. while high pressure oxidation is usually carried out at temperatures of 900–960° C. In addition to ammonia other nitrogen-containing gases may be utilized as a source of the oxides of nitrogen from which nitrogen tetroxide is produced by the process of the invention. Examples of other nitrogen-containing gas streams which may be subjected to combustive oxidation for production of nitrogen tetroxide include those in which hydrogen, ammonia synthesis gas, or methane is admixed with nitric acid vapor. Generally, the gas stream produced by oxidation of nitrogen-containing gas for use in the process of the invention contains primarily nitrogen, about 65–85% nitrogen, and typically about 4–10% nitric oxide, 0.5–9% nitrogen dioxide, 4–12% oxygen and 1–15% water vapor. Preferably, ammonia gas is oxidized at the lower pressures using a cobalt catalyst to produce a gas stream which contains generally about 68–75% nitrogen, 6–10% nitric oxide, 0.5–2.0% nitrogen dioxide, 6–10% oxygen and 10–14% water vapor.

The ammonia oxidation gas stream discharged from the catalytic oxidizer through line 6 is cooled by passing first through waste-heat boiler 7 and then through line 8 into heater-interchanger 2 from which it is discharged into line 9 at a temperature of about 100–300° C., preferably at a temperature of 150–250° C. The gas stream is then introduced into a lower portion of reactor-cooler 11 which is desirably an elongated internally indirectly cooled zone. Preferably, reactor-cooler 11 is of the shell and tube type equipped with spaced partially overlapping baffles 12 throughout its length which is preferably at least about 5 times the inside diameter of the shell. In reactor-cooler 11, the gas stream introduced through line 9 flows upwardly in counter-current contact with down-flowing nitric acid which has been withdrawn from storage tank 13 and introduced after suitable cooling into an upper portion of reactor-cooler 11 through line 14. Under the conditions of operation in reactor-cooler 11 the down-flowing nitric acid combines with nitric oxide in the up-flowing gas stream to substantially increase the amount of nitrogen dioxide according to the known reaction:

$$2HNO_3 + NO \rightleftharpoons 3NO_2 + H_2O \qquad (1)$$

The nitric acid introduced into the upper portion of the reactor-cooler is at a temperature of about 15–40° C., preferably 30–35° C. At time of introduction into the reactor-cooler the nitric acid should have a concentration of about 50–68%, preferably a concentration of 55–63%. Based on the concentration of the acid employed the amount of the nitric acid introduced into reactor-cooler 11 is of particular importance. As evident from the above Equation 1 it is possible to consume the nitric acid in the reactor-cooler and simultaneously form nitrogen dioxide. As nitrogen dioxide at various points in the process is converted to nitric acid the amount of nitric acid introduced into reactor-cooler 11 is therefore desirably regulated to reduce at least that amount of nitric acid which is formed during the operation and thereby carry out the process without net production of nitric acid. Regulation of the process to effect this result may be accomplished in several ways, preferably by controlling the level of nitric acid in storage tank 13 to which substantially all nitric acid formed during the process is sent. The reaction of nitric acid and nitric oxide according to Equation 1 above is endothermic which facilitates cooling of the gases entering reactor-cooler 11. In addition to controlling by-product nitric acid in reactor-cooler 11 it is also important that during this stage of the operation substantial dehydration of the ammonia oxidation gas be effected. Dehydration of the ammonia oxidation gas to a low level of less than about 2% by weight is particularly desirable and therefore additional cooling to control the temperature in reactor-cooler 11 is important. In order to effectively accomplish dehydration of the gas in reactor-cooler 11, cooling under carefully regulated temperature conditions is effected by indirect heat exchange in at least the upper portion of the zone of contact between the up-rising gas stream and downflowing acid in the reactor-cooler. Preferably, cooling is effected by indirect heat exchange throughout the general zone area in which the nitric acid and ammonia oxidation gas are in contact in the reactor-cooler. The desired cooling in reactor-cooler 11 may be accomplished by ordinary cooling water introduced through line 15 and flowing through the interior tubes 16 of the reactor for exit therefrom through line 17. Temperature conditions in reactor-cooler 11 are regulated by the cooling at a temperature within the range of about 32–45° C., preferably at a temperature of 35–40° C. In the reactor-cooler 11 a temperature below about 45° C. has been found required to effect substantial cooling and dehydration of the gas while suppressing tendency of the nitric oxide in the gas to favor reaction with contained oxygen rather than with the nitric acid which latter reaction forms three times the amount of nitrogen dioxide. Thus, a temperature below about 45° C. is highly desirable for maintaining optimum conditions for consumption of required large amounts of nitric acid in the reactor-cooler 11. Control of the temperature conditions in reactor-cooler 11 above a lower limit of about 32° C. is particularly important to effect required dehydration of the gas stream while simultaneously avoiding conditions which favor the combination of nitrogen dioxide in the gas stream with water to form undesired dilute nitric acid during the cooling. The cooling water introduced through line 15 flows through the interior tubes of the cooler counter-current the gas flow and usually has a temperature within the range of about 10–30° C., preferably 15–

25° C. Water from the dehydration of the gas stream plus water from the reaction of nitric oxide with nitric acid combines with the non-reacted nitric acid to form dilute 15 to 30% nitric acid, more usually nitric acid of about 20 to 28% concentration. This dilute nitric acid is discharged from the lower portion of reactor-cooler 11 through line 18 for regeneration and reuse in the process.

The gas entering reactor-cooler 11 is generally at a low pressure, usually between about 0 to 25 p.s.i.g., more usually under a slight pressure of about 6–15 p.s.i.g. The gas stream which exits reactor-cooler 11 through line 19 is generally at a slightly lower pressure representing a drop of about 1–2 p.s.i.g. Temperature of the gas on discharge from the reactor-cooler is about 32–45° C., preferably about 35–45° C. From line 19, the gas stream containing increased amounts of nitrogen dioxide is carried to compressor 21, which may be any suitable type of gas compressor such as a centrifugal or axial compressor. Compressor 21 compresses the gas to a pressure of at least about 65 p.s.i.g., generally a pressure not in excess of about 200 p.s.i.g., and preferably to a pressure within the range of about 80–130 p.s.i.g. The gas discharged from compressor 21 under pressure is heated to 125–250° C. by heat of compression, preferably to a temperature between 175–225° C., and fed through line 22 to reactor-condenser 23 where the heated gas, under pressure, is cooled by indirect heat exchange. Reactor-condenser 23 is desirably of the shell and tube type in which cooling water introduced through line 24 passes through tubes 26 and exits by line 27. The water introduced through line 24 into reactor-condenser 23 for indirect cooling is generally at a temperature of about 10° to 30° C. preferably at a temperature of about 15° to 25° C. In reactor-condenser 23 cooling of the gas stream is accompanied by formation of nitric acid by the combination of nitrogen dioxide with residual water vapor in the gas stream according to the reactions:

$$3NO_2 + H_2O \rightleftharpoons 2HNO_3 + NO \quad (2)$$
$$NO + \tfrac{1}{2}O_2 \rightleftharpoons NO_2 \quad (3)$$

Under conditions of operation of the process, the amount of water vapor in the gas stream entering reactor-condenser 23 is at a desirably low level which not only minimizes the amount of nitrogen dioxide taken from the gas stream by formation of nitric acid on cooling, but also makes the nitric acid formed of high concentration, desirably higher in concentration than the nitric acid introduced through line 14 into reactor-cooler 11. The nitric acid formed in reactor-condenser 23 has a concentration of from at least about 65% up to about 85%, preferably a concentration of about 68% to 80%. This nitric acid is withdrawn from reactor-condenser 23 through drain lines 28, 29, 31 and 32, combined in line 33, and passed into line 34 for further use in the process. As a result of the conditions in reactor-condenser 23 the amount of water vapor remaining in the gas stream is further reduced to a desired low level of less than 1.0% by weight, more usually to less than about 0.5% by weight.

The gas stream discharged from reactor-condenser 23 through line 35 has been cooled to a temperature of about 20–50° C. preferably a temperature of about 20–35° C. Under conditions of operation in reactor-condenser 23 a substantial portion of the nitric oxide content of the gas stream is oxidized to nitrogen dioxide such that the gas stream on exit from the reactor-condenser contains desirably at least about 12% nitrogen dioxide and less than about 1.0% nitric oxide. The gas stream discharged from the reactor-condenser 23 therefore contains not only reduced, substantially negligible amounts of water vapor but also substantially increased amounts of nitrogen dioxide and a desirably low nitric oxide content.

The gas stream still under a pressure of at least about 65 p.s.i.g. flows through line 35 and after admixture with the gas stream entering from line 36 is introduced into an upper portion of oxidation chamber 37. Prior to introduction into chamber 37 the gas stream is enriched in oxygen by admixture with a gas stream combining off-gases from a subsequent oxidation zone and acid-reactor. The enriching gas stream which is fed into main line 35 through line 36 is composed mainly of oxygen and nitrogen dioxide. The combined off-gas stream introduced into line 35 constitutes only a small portion of the total resulting gas stream introduced into oxidation chamber 37, usually only about 0.2 to 0.6% while increase in oxygen content is about 3 to 7% based on the weight of each of these components in the gas stream entering chamber 37. Oxidation chamber 37 is preferably constructed of stainless steel and provided with overlapping spaced stainless steel baffle plates 38. The gas stream passes downwardly within oxidation chamber 37 at a temperature of about 30–80° C., preferably 40–60° C., to oxidize residual nitric oxide in the gas mixture by contained oxygen to nitrogen dioxide. Because the makeup of the gas stream entering chamber 37 is already at desirably low nitric oxide level the reaction in chamber 37 is such that essentially little or only trace amounts of nitric oxide are retained in the gas stream discharged from chamber 37 through line 39. The reduction of the nitric oxide content of gas exiting chamber 37 to less than 0.3% by weight, desirably less than 0.1% by weight, is a rather important feature of the process enabling more efficient operation during the absorption step. In practice, therefore, it is possible to obtain a gas mixture in which the nitrogen dioxide content is increased to above 95.0% based on the total nitric oxide and nitrogen dioxide in the gas mixture, with values of about 99.0% and even greater being usually obtained.

The gas mixture discharged from chamber 37 through line 39 at a temperature between 30–80° C. is introduced through line 39 into absorber column 41. The gas mixture enters a lower portion of absorber column 41 which is preferably a two stage absorption column constructed of stainless steel. Two absorption zones 42 and 43 are preferably provided with acid resistant packing, e.g., stoneware or porcelain and have sprayheads 44 and 45 disposed respectively above the packing of each zone. Absorber column 41 operates at a pressure of at least 65 p.s.i.g., preferably at a pressure of about 80–130 p.s.i.g., and at a temperature within the range of about 20–60° C., preferably at a temperature of about 20 to 35° C. Concentrated nitric acid of about 85–95%, usually about 88–91%, is fed through line 46 and introduced from spray head 45 at a temperature of about 20–50° C. onto the packing in upper zone 43. The nitric acid flows downwardly through the packing of the upper stage 43 and then downwardly through the packing of lower zone 42 after mixture with recycled nitric acid introduced from sprayhead 44. The nitric acid is in intimate counter-current contact with the uprising gas mixture whereby the nitrogen dioxide is selectively absorbed and removed from the gas mixture. The nitric acid contacting the gas mixture in the lower stage 42 has a concentration of typically about 80–90% or somewhat less than the nitric acid which contacts the gas mixture in the upper stage 43. In order to balance the nitric acid concentration and absorption operation a portion of the mixture of concentrated nitric acid and absorbed nitrogen dioxide withdrawn through line 47 is diverted through line 48 and fed by pump 49 through line 51 to cooler 52 which may be any suitable type cooler, desirably a shell and tube type constructed of stainless steel. In cooler 52 the nitric acid containing absorbed nitrogen dioxide is cooled by indirect heat exchange with ordinary water introduced into cooler 52 at a temperature of generally about 5–30° C. through line 53 and discharged therefrom through line 54. The concentrated nitric acid with absorbed nitrogen dioxide cooled to a temperature of about 20–35° C. is discharged from cooler 52 and fed through line 56 to sprayhead 44 for introduction into the lower stage of the absorber column.

The gases which are unabsorbed in absorber column 41 exit the column through line 57. The off-gas from the absorber column is made up predominantly of nitrogen with lesser amounts of oxygen, nitrogen dioxide and nitric acid vapor along with trace amounts of nitric oxide and water vapor. While the nitric acid and nitrogen oxides content of the off-gas is low, recovery and reuse of these materials is important from an economic standpoint. The gas stream is fed through line 59 into a lower portion of a nitric acid absorption column 61 where the gas stream flows upwardly in counter-current relation to water introduced into the column through line 62. Absorption column 61 is desirably equipped with a plurality of plates 63 and operated at a pressure of at least 65 p.s.i.g., preferably at a pressure of about 80–120 p.s.i.g. The plates are desirably each equipped with cooling coils to maintain the temperature within the column within a range of 20–60° C. preferably at about 20–40° C. In absorption column 61, the upflowing gases are scrubbed by water in counter-current contact to form nitric acid of about 35–55% concentration, more usually nitric acid of about 40–50% concentration, according to the reactions:

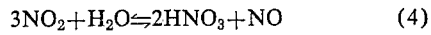

$$3NO_2 + H_2O \rightleftharpoons 2HNO_3 + NO \quad (4)$$

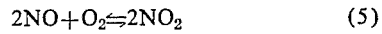

$$2NO + O_2 \rightleftharpoons 2NO_2 \quad (5)$$

In column 61 substantially the entire amount of nitrogen oxides may be recovered for use in the process with the gases vented to the atmosphere through line 64 containing predominantly nitrogen with small amounts of oxygen and less than about 0.2% by volume of nitrogen oxides. The nitric acid produced in absorption column 61 is withdrawn from the lower portion of the column through line 66 and combined with the dilute nitric acid discharged from reactor cooler 11 through line 18.

The stream of concentrated nitric acid containing absorbed nitrogen dioxide discharged from absorber column 41, after recycling of a portion through line 48, is divided into two streams representing a major and minor portion and the major portion fed through line 67. The amount of concentrated nitric acid with absorbed nitrogen dioxide fed through line 67 usually represents about 94 to 98% by weight of the amount discharged from absorber column 41 after provision for recycle to the column. The nitric acid containing the absorbed nitrogen dioxide in line 67 is increased in concentration by combination with nitric acid of about 90–97% concentration (exclusive of nitrogen dioxide content), preferably 92–96% concentration, introduced through line 68. The resulting stream of nitric acid with absorbed nitrogen dioxide has a nitric acid concentration of about 85 to 95% (exclusive of nitrogen dioxide content) and is introduced into an intermediate section of fractionating column 69 after heating to a temperature of about 45–65° C. by indirect heat exchange with a portion of the fractionating column bottoms in interchanger 70.

Fractionating column 69 is desirably a combination unit having an upper plate column section 71 and lower packed section 72. The upper section 71 of fractionating column 69 is preferably a multi-plate column fabricated of stainless steel and titanium. The lower portion 72 is preferably constructed of titanium and contains acid resistant packing such as stoneware or porcelain. Fractionating column 69 is operated at a temperature of about 20–120° C. and at a pressure of about 8–25 p.s.i.g. Preferably, the fractionating column is operated such that the temperature at the top of the column is about 30–45° C. while the temperature in the bottom zone area is about 110–120° C. The concentrated nitric acid with absorbed nitrogen dioxide entering fractionating column 69 is distilled and the nitrogen dioxide separated from the nitric acid. The nitric acid from which the nitrogen dioxide has been liberated flows downwardly as bottoms into a lower portion of fractionating column 69 below the packing of section 72. The fractionating column bottoms is nitric acid of about 85–95% concentration admixed with a small amount of liquid nitrogen tetroxide, generally less than about 1.0% nitrogen tetroxide, more usually less than about 0.5% nitrogen tetroxide. This nitric acid mixture is withdrawn from the lower portion of the column through line 73 for circulation through a reboiler unit 74 where a portion of the nitric acid is vaporized at a temperature of about 110 to 120° C. by indirect heat exchange with steam introduced at a pressure typically of about 65 p.s.i.g. through line 76 with condensate withdrawn from the reboiler unit through line 77. A portion of the nitric acid withdrawn from the column through line 73 is fed through line 78 and cooled first in interchanger 70 by indirect heat exchange with fractionating column feed and then in cooler 79 by indirect heat exchange with water entering the cooler through line 81 and discharged through line 82. The acid mixture cooled to a temperature of about 20 to 50° C. is discharged from cooler 79 into line 83 and returned by pump 84 through line 46 to spray head 45 and into the upper portion of absorber column 41.

The nitrogen dioxide liberated from the concentrated nitric acid in fractionating column 69 exits the column overhead through line 86 and is introduced into condenser 87 where it is condensed to liquid nitrogen tetroxide by indirect heat exchange with water entering the cooler through line 88 and discharged through line 89. The condensed liquid nitrogen tetroxide at a temperature of about 30 to 40° C. is discharged from condenser 87 through line 91 into surge tank 92. Liquid nitrogen tetroxide withdrawn from surge tank 92 through line 93 is divided and a portion of the liquid nitrogen tetroxide fed through line 94 and returned to the upper section 71 of the fractionating column 69. Sufficient liquid nitrogen tetroxide is returned to fractionating column 69 to provide a reflux ratio in the column of about 0.15 to 1.0, preferably a reflux ratio of about 0.2 to 0.3.

The concentrated nitric acid introduced through line 68 for admixture with the nitric acid containing absorbed nitrogen tetroxide in line 67 is obtained from acid reactor column 96 which is a special column adapted to produce highly concentrated nitric acid. Acid reactor column 96 is preferably constructed of stainless steel with an acid resistant packing section in the central portion of the column. A portion of the highly concentrated nitric acid produced in column 96 is recycled to an upper portion of the column through line 97 and flows downwardly over the packing in counter-current flow contact with nitrogen dioxide and the oxygen-containing gas. The nitrogen dioxide utilized in reactor column 96 is obtained from the subsequent nitrogen tetroxide product stream and enters the lower portion of column 96 through line 47 along with a minor portion of the concentrated nitric acid containing absorbed nitrogen dioxide discharged from absorber column 41. The concentrated nitric acid containing absorbed nitrogen dioxide sent to the acid reactor 96 represents about 0.5–10.0%, preferably 2.0–6.0%, of the acid discharge from absorber column 41 after provision for recycle to the column. In line 47 the nitric acid obtained from the absorber column 41 is admixed with additional concentrated nitric acid introduced through line 98 and representing a minor portion of about 5–15% of the nitric acid discharged from reactor-condenser 23 through line 34 in order to replace nitric acid removed overhead from absorber column 41 and sent to nitric acid-absorption column 61. The oxygen-containing gas utilized in column 96 is preferably commercial oxygen and is introduced into the lower portion of the column through line 100. Column 96 operates at a temperature of about 20–60° C. and under a pressure of about 65–125 p.s.i.g. Preferred operating conditions in the acid-reactor are a temperature of about 30–50° C. and pressure of about 90–100 p.s.i.g. The liquid fractions entering the lower portion of acid reactor column 96 are withdrawn through line 99 and introduced to cooler 101 where the liquid mixture is cooled to a temperature of about 30 to 50° C. by indirect heat exchange with water introduced into the cooler through line 102 and discharged therefrom through line 103. Off-gas from the acid-reactor is composed largely of nitrogen dioxide and oxygen in the ratio of generally about 0.6:1.0 to 1.0:1.0. The off-gas is discharged from the acid recator through line 104 and fed into line 36 for admixture in line 35 with the main gas stream exiting the reactor-condenser 23.

The liquid nitrogen tetroxide discharged from surge tank 92 through line 93 is introduced into the upper portion of an oxidation column 106 through spray head 107. Oxidation column 106 is preferably a packed column constructed of stainless steel and having an intermediate packed section 108 filled with an acid resistant packing such as stoneware or porcelain. An oxygen-containing gas, preferably commercial oxygen, is introduced through line 109 into a lower portion of column 106 below the packed section 108. The liquid nitrogen tetroxide together with any residual nitric oxide passes downwardly in column 106 in intimate counter-current contact in the packed section with oxygen to oxidize the residual nitric oxide to nitrogen dioxide. Operating temperature in oxidation column 106 is preferably about 20–40° C. with the column being maintained under a pressure of about 90–125 p.s.i.g. Substantially pure liquid nitrogen tetroxide of at least about 99.4% concentration is withdrawn from the lower portion of column 106 through line 111. A minor portion representing about 10 to 40%, more usually about 25 to 35%, of the liquid nitrogen tetroxide is shunted through line 112 for utilization in acid reactor column 96. The major portion of the high purity liquid nitrogen tetroxide is recovered through line 111 as product. In oxidation column 106 uncondensed gases comprising nitrogen dioxide and oxygen are withdrawn from the upper portion of the column through line 36 for admixture in line 35 with the gas stream exiting reactor-condenser 23.

In order to obtain high efficiency and high yields in nitrogen tetroxide manufacture without by-product nitric acid production the process of the present invention takes into account the formation of different streams of nitric acid of varying concentration during the process. The stream of dilute nitric acid discharged from reactor-cooler 11 through line 18 is therefore comingled with the more concentrated nitric acid from acid absorption column 61 and the mixture fed to a surge tank 116. The nitric acid in surge tank 116 generally has a concentration of about 20–45%, more usually about 25–35%, and is fed through line 117 to an intermediate section of an acid concentrator 118 which is preferably a plate column constructed of stainless steel. Concentrator 118 is operated at about 140–240 mm. Hg (abs.), preferably 150–180 mm. Hg (abs.), and at a temperature of about 60–100° C. In acid concentrator 118 water is removed from the nitric acid and discharged overhead through line 119. Condensate is added through line 122 in amount sufficient to establish a reflux ratio of about 0.2 to 0.5. Nitric acid from the bottom of the concentrator is withdrawn through line 123 and a portion fed through line 124 to a reboiler unit 126 where the nitric acid is heated by indirect heat exchange with steam fed to the reboiler unit through line 127 with condensate being withdrawn from the reboiler through line 128. The remainder of the acid concentrator bottoms representing nitric acid of about 50 to 70% is fed through line 123 and discharged into line 34 where it is combined with the concentrated nitric acid discharged into line 34 from reactor-condenser 23. The combined nitric acid stream may be mixed with a portion of dilute acid fed from tank 116 through line 121. The resulting nitric acid mixture having a concentration of about 50 to 68%, desirably 55–63%, is stored in tank 13 from which the nitric acid is withdrawn through line 14 as feed to reactor-cooler 11 after cooling in cooler 125. Operation of the process without net production of nitric acid is effectively controlled by regulation of the nitric acid level in storage tank 13. In order to operate the process without net by-product nitric acid production the flow of nitric acid through line 14 to reactor-cooler 11 is generally regulated such that about 10 to 35 parts by weight of nitric acid is supplied to reactor-cooler 11 per 100 parts by weight of ammonia oxidation gas introduced into the reactor-cooler through line 9. When operated on an integrated, self-contained basis without net production or consumption of nitric acid the concentraton of the acid in storage tank 13 is desirably not substantially in excess of about 63%, preferably 55–63%, and the preferred rate of flow is about 15 to 25 parts of nitric acid per 100 parts of oxidation gas obtained by low pressure catalytic oxidation of ammonia. In special situations where it is desirable to increase production of nitrogen tetroxide the rate of flow of nitric acid to reactor-cooler 11 may be increased and the process operated to consume nitric acid. In such situations nitric acid of suitable concentration, preferably 50 to 65% nitric acid, may be added to the nitrogen tetroxide plant, preferably by introduction directly into storage tank 13 through line 131. It will be evident therefore that the process of the present invention carried out on a continuous basis produces nitrogen tetroxide in yields of not only at least about 100% based on the nitrogen oxides content of the gas stream fed to the reactor-cooler but also may be operated to produce the nitrogen tetroxide on a yield basis exceeding 100% and up to yields of about 130% or even greater, if desired.

The following example in which parts and percentages are by weight demonstrates the practice and advantages of the present invention.

Example 1

In a nitrogen tetroxide plant atmospheric air is drawn through a filter by an air blower and compressed to about 12 p.s.i.g. The compressed air is mixed with ammonia and the resulting mixture containing 5.6% ammonia preheated in an oxidation interchanger to 150° C. From the oxidation interchanger the gas mixture is fed to ammonia oxidizers containing a cobalt metal catalyst where the ammonia gas is oxidized at a temperature of about 815° C. Effluent gas from the ammonia oxidizers is first cooled in a waste heat boiler to a temperature of about 280° C. and then in the oxidation interchanger to a temperature of about 220° C. The gas exiting the oxidation interchanger at 220° C. is under a pressure of about 9 p.s.i.g. and has the following composition:

| | Wt. percent |
|---|---|
| NO | 8.95 |
| $NO_2$ | 0.65 |
| $O_2$ | 8.29 |
| $N_2$ | 70.70 |
| $H_2O$ | 11.41 |

The ammonia oxidation gas is fed at a rate of about 1000 parts per minute to a lower portion of a reactor-cooler which is a vertical baffled, shell and tube condenser having length approximately 6 times the interior diameter of the shell. About 5,500 parts per minute of water at a temperature of about 27° C. is continuously passed downwardly within the tubes of the condenser. Into the upper portion of the reactor cooler about 204 parts per minute of 60% nitric acid is introduced on the shell side and flows counter-current to the uprising ammonia oxidation gas introduced into the lower section of the reactor cooler. About 261 parts per minute of 26.8% nitric acid is discharged from the lower portion of the reactor cooler. The treated gas at a temperature of about 37° C. and at a pressure of about 7 p.s.i.g. is discharged at a rate of 947 parts per minute from the upper section of the reactor column and has the following composition:

| | Wt. percent |
|---|---|
| NO | 7.38 |
| $NO_2$ | 7.78 |
| $O_2$ | 8.28 |
| $N_2$ | 74.84 |
| $H_2O$ | 1.28 |
| $HNO_3$ | 0.44 |

The gas stream is then fed to a centrifugal type gas compressor where it is compressed to about 100 p.s.i.g. From the compressor the gas stream at a temperature of about 195° C. is introduced into a reactor-condenser which is also a baffled shell and tube type condenser having length about 6 times interior shell diameter. The reactor-condenser is horizontally disposed with 13,300 parts per minute of cooling water at a temperature of about 27° C. being fed through the tubes counter-current to gas flow through the condenser. In the reactor-condenser the gas stream is cooled by indirect heat exchange with the cooling water resulting in the formation of 76% nitric acid which is withdrawn from the reactor-condenser at intermediate points and discharged therefrom at an overall rate of about 33 parts per minute. 30 parts per minute of 76% nitric acid is recycled for introduction into the reactor-cooler while the remaining nitric acid at a rate of 3 parts per minute is sent to an acid reactor. The gas entering the reactor condenser at 125° C. is cooled to about 35° C. during which the nitrogen dioxide content of the gas is substantially increased by oxidation of nitric oxide such that the gas exiting the reactor-condenser has the following composition:

| | Wt. percent |
|---|---|
| NO | 0.81 |
| $NO_2$ | 16.58 |
| $O_2$ | 4.65 |
| $N_2$ | 77.61 |
| $HNO_3$ | 0.24 |
| $H_2O$ | 0.11 |

The gas is discharged from the reactor-condenser at a rate of 914 parts per minute and is admixed with about 3.5 parts per minute of a combined recycled gas stream containing about 43% nitrogen dioxide and 57% oxygen and representing off-gases from the acid-reactor and a final oxidation zone. The resulting gas stream containing 0.81% nitric oxide, 16.7% nitrogen dioxide and 4.85% oxygen is fed at a pressure of about 94 p.s.i.g. to an enlarged baffled oxidation chamber where residual nitric oxide is oxidized to nitrogen dioxide by contained oxygen. The gas exits the oxidation chamber at a temperature of about 55° C. and pressure of 93 p.s.i.g. and has the following composition:

| | Wt. percent |
|---|---|
| NO | 0.04 |
| $NO_2$ | 17.85 |
| $O_2$ | 4.37 |
| $N_2$ | 77.40 |
| $HNO_3$ | 0.24 |
| $H_2O$ | 0.10 |

The gas stream is then introduced into a nitrogen dioxide absorber which is a packed column operating at about 90 p.s.i.g. and at a temperature of about 50° C. The absorber column has two superimposed packed sections with spray heads above the packing of each section. Nitric acid of about 90% strength is introduced above the packing in each section with the nitric acid introduced above the lower section being obtained at a rate of 5,440 parts per minute by recirculating after cooling a portion of the nitric acid withdrawn from the lower section of the column. The nitric acid introduced above the packing of the upper packed section is obtained at a rate of about 1,220 parts per minute after cooling from the liquid bottoms discharged from the subsequent nitrogen dioxide fractionating column. Unabsorbed gas discharged from the top of the nitrogen dioxide absorber column has the following composition:

| | Wt. percent |
|---|---|
| NO | 0.02 |
| $NO_2$ | 1.67 |
| $O_2$ | 5.22 |
| $N_2$ | 91.06 |
| $H_2O$ | 0.02 |
| $HNO_3$ | 2.01 |

This off-gas is pumped at a rate of about 779 parts per minute to a nitric acid absorption column which is a plate column with cooling coils on the plates to maintain the column temperature at about 28° C. The absorption column operates at a pressure of about 90 p.s.i.g. with the uprising gas scrubbed in counter-current flow with water fed to the top of the column at a rate of about 43 parts per minute. Overhead gases containing less than about 0.2% nitrogen oxides are vented to the atmosphere from the top of the column. From the bottom of the absorption column about 67 parts per minute of 45% nitric acid is discharged and combined with the 26.8% nitric acid from the reactor-cooler. The resulting mixture is fed at a rate of 328 parts per minute to an acid concentrator which is a 15-plate column operating at about 160 mm. Hg (abs.) and at a bottom temperature of about 90° C. In the acid concentrator water is removed from the acid overhead with a portion of the condensate returned as reflux to the upper portion of the column at a reflux ratio of about 0.4. A portion of the acid concentrator bottoms is recycled through a steam heated reboiler to supply heat to the acid concentrator. The remaining portion of the acid concentrator bottoms constituting about 59% nitric acid is fed at the average rate at about 175 parts per minute to a storage tank after combining with the 76% nitric acid discharged from the reactor-condenser. The overall concentration of the nitric acid in the storage tank is about 60% and is withdrawn therefrom for introduction into the reactor-cooler.

From the nitrogen dioxide absorber column there is discharged after provisions for recycle to the column about 1,359 parts per minute of about 89% nitric acid containing about 11.5% absorbed nitrogen dioxide. This stream is split into two parts with the smaller part amounting to about 42 parts per minute being sent to the acid reactor which is packed column operating at about 100 p.s.i.g. and at a temperature of about 41° C. Prior to introduction into the acid reactor the nitric acid containing absorbed nitrogen dioxide is combined with 76% nitric acid from the reactor-condenser at a rate of 3 parts per minute and with a stream of liquid nitrogen tetroxide recycled at a rate of about 58.6 parts per minute. Commercial oxygen is introduced into the lower portion of the acid reactor at a rate of about 1.7 parts per minute. In the acid reactor nitrogen dioxide, oxygen and water vapor rise upwardly in counter-current contact with recycled nitric acid product to produce as bottoms 94% nitric acid. The concentrated 94% nitric acid is withdrawn from the lower portion of the acid reactor at a rate of about 2,500 parts per minute and after cooling by indirect heat exchange with water to a temperature of about 40° C. is divided into two parts. The larger portion is recycled to the top of the acid reactor while the smaller portion amounting to about 105 parts per minute is combined with the major portion of the nitric acid containing the absorbed nitrogen dioxide for introduction into the nitrogen dioxide fractionating column.

The concentrated 94% nitric acid from the acid reactor increases the strength of the nitric acid absorption medium from about 89% nitric acid to about 90% nitric acid and the combined stream is introduced into an intermediate section of the fractionating column after heating to a temperature of about 55–65° C. by indirect heat exchange with the fractionating column bottoms. The nitrogen dioxide fractionating column is a combination packed and plate column. The lower part of the column is a packed section for stripping while the upper section is a 12-plate column. The liquid stream of 90% nitric acid containing absorbed nitrogen dioxide enters the fractionating column at the top of the packed section at a rate of about 1,422 parts per minute. The top of the column is at a temperature of about 40° C. while the bottom is at a temperature of about 118° C. Pressure in the column is about 21 p.s.i.g. with liquid nitrogen tetroxide being returned to the top of the column to establish a reflux ratio of about 0.25. Nitrogen dioxide is discharged from the top of the column and condensed to liquid nitrogen tetroxide at a rate of about 269 parts per minute. Nitric acid of about 90% concentration and containing less than about 0.5% absorbed nitrogen dioxide is discharged from the bottom of the fractionating column. A portion of this nitric acid is recycled through a reboiler unit and heated by indirect heat exchange with steam to maintain temperature conditions in the column. The remaining portion of the nitric acid withdrawn from the bottom of the fractionating column is first cooled by indirect heat exchange with the fractionating column feed and then by indirect heat exchange by water to a temperature of about 35° C. The cooled nitric acid is then recycled at the rate of 1,220 parts per minute to the top section of the nitrogen dioxide absorber column as absorbing medium.

The condensed liquid nitrogen tetroxide from the fractionating column is introduced at a rate of 201 parts per minute by means of a spray-head into the top section and above the packing of an elongated oxidation column having length about 10 times internal diameter. Commercial oxygen is introduced at the rate of about 1.7 parts per minute into the lower section of the oxidation column and rises upwardly in counter-current contact with the downflowing liquid nitrogen tetroxide to oxidize residual nitric oxide. The oxidation column operates at a pressure of about 120 p.s.i.g. and at a temperature of about 40° C. About 3 parts per minute of a gas stream containing about 43% nitrogen dioxide is released overhead from the oxidation chamber and sent for admixture with the gas stream exiting the reactor-condenser. About 200 parts per minute of liquid nitrogen tetroxide is withdrawn from the bottom of the oxidation column and split into two parts. The minor portion representing about 58.6 parts per minute is recycled for use in the acid reactor. The balance representing about 141.4 parts per minute of 99.4% pure liquid nitrogen tetroxide is recovered from the plant as a product. During continuous operation of the process under equilibrium conditions the total amount of nitric acid formed was substantially equivalent to the amount reduced in the reactor-cooler such that the process operated without net production of by-product nitric acid.

We claim:
1. The process for manufacture of nitrogen tetroxide without net production of nitric acid which comprises (A) oxidizing ammonia gas at elevated temperature to provide a gas stream containing primarily nitrogen and lesser amounts of nitric oxide, nitrogen, dioxide, oxygen and water vapor, (B) cooling the ammonia oxidation gas to a temperature of about 100–300° C. and introducing the cooled gas stream into a lower portion of an elongated internally cooled reactor-cooler zone, (C) introducing into an upper portion of said zone 55–63% nitric acid, (D) subjecting said ammonia oxidation gas stream and said nitric acid to counter-current flow contact within said zone while simultaneously regulating the temperature throughout substantially the entire zone of contact by indirect heat exchange at a temperature within the range of about 32–45° C., and the pressure within the range of about 0–25 p.s.i.g., (E) discharging from the upper portion of said zone a gas stream having a temperature of about 32–45° C. and containing substantially increased amounts of nitrogen dioxide and less than 2% by weight water vapor, (F) withdrawing dilute nitric acid from the lower portion of the zone, (G) compressing the gas to a superatmospheric pressure of at least about 65 p.s.i.g., (H) introducing the gas under pressure into an enlarged reactor-condenser zone and subjecting the gas stream in said zone to cooling by indirect heat exchange at a temperature within the range of about 20–50° C., (I) withdrawing from said reactor-condenser zone a liquid stream of nitric acid having a concentration at least greater than that introduced into said reactor-cooler zone, (J) discharging from the reactor-condenser zone a gas stream containing substantially increased amounts of nitrogen dioxide and less than about 1% by weight nitric oxide, (K) maintaining the gas stream withdrawn from the reactor-condenser zone under pressure and oxidizing residual nitric oxide in the gas stream to nitrogen dioxide by contained oxygen at a temperature within the range of about 30–80° C., (L) introducing the gas stream still under pressure of at least about 65 p.s.i.g. into the lower portion of an absorption zone having a temperature with the range of about 20–60° C. and contacting said gas stream in counter-current flow contact with 85–95% concentrated nitric acid to selectively absorb nitrogen dioxide from the gas stream in stages within said absorption zone, (M) releasing from an upper portion of the absorption zone an off-gas stream containing primarily nitrogen with small amounts of nitrogen dioxide, nitric acid, and oxygen and trace amounts of nitric oxide and water and introducing said off-gas stream into the lower portion of an enlarged nitric acid absorption zone having a temperature within the range of about 20–60° C., (N) contacting the off-gas stream in said nitric acid absorption zone under counter-current flow conditions with water under superatmospheric pressure conditions of at least 65 p.s.i.g. to form nitric acid of about 35–55% concentration, (O) combining the nitric acid from the nitric acid absorption zone with the dilute nitric acid withdrawn from the reactor-cooler zone and subjecting the combined nitric acid mixture to heating within an enlarged acid concentrator column to produce nitric acid of about 55–65% concentration, (P) combining the nitric acid from the acid concentrator with concentrated nitric acid withdrawn from the reactor-condenser zone and returning the combined nitric acid for introduction into the reactor-cooler zone, (Q) withdrawing from the nitrogen dioxide absorption zone a liquid stream composed of a mixture of nitric acid and absorbed nitrogen dioxide and dividing said liquid stream into a minor portion and a major portion, (R) combining a minor portion of said liquid stream with a recycled stream of substantially pure liquid nitrogen tetroxide and introducing the combined mixture into an enlarged acid-reactor zone having a temperature within the range of about 20–60° C., (S) introducing an oxygen-containing gas into the acid-reactor zone and subjecting nitrogen dioxide and said oxygen-containing gas to intimate counter-current flow contact at a pressure within the range of about 65–125 p.s.i.g. with recycled nitric acid to produce nitric acid of greater concentration than that of the nitric acid containing the absorbed nitrogen dioxide introduced into said zone, (T) withdrawing the concentrated nitric acid from said acid-reactor zone and commingling said nitric acid with the major portion of the nitric acid containing absorbed nitrogen dioxide from the nitrogen dioxide absorption zone, (U) introducing the combined nitric acid mixture containing absorbed nitrogen dioxide into a fractionating column having a temperature within the range of about 20–120° C. and a pressure within the range of about 90–125 p.s.i.g. to separate the mixture therein into a separate overhead stream of nitrogen dioxide and a bottoms fraction of concentrated nitric acid, (V) condensing the gaseous nitrogen dioxide from the fractionating column and subjecting the resulting liquid nitrogen tetroxide to counter-current flow contact with an oxygen-containing gas within an oxidation zone to oxidize residual nitric oxide to nitrogen tetroxide, (W)

commingling the off-gas streams containing nitrogen dioxide and oxygen released from said oxidation zone and from the acid-reactor with the gas stream released from the reactor-condenser zone, (X) discharging liquid nitrogen tetroxide from a lower portion of the oxidation zone and dividing said liquid nitrogen tetroxide into a major portion and a minor portion, (Y) recycling said minor portion of the liquid nitrogen tetroxide to the acid-reactor, and (Z) recovering the major portion of the high purity liquid nitrogen tetroxide as product; the amount of nitric acid in contact with said gas stream within the cooled reactor-cooler zone being regulated to reduce an amount of nitric acid at least substantially equivalent to the amount of acid produced during said process such that the nitrogen tetroxide is produced without net production of by-product nitric acid.

2. The process of claim 5 in which the gas stream is ammonia oxidation gas containing about 68–75% nitrogen, 6–10% nitric oxide, 0.5–2% nitrogen dioxide, 6–10% oxygen and 10–14% water vapor and is cooled by counter-current flow contact with 55–63% concentrated nitric acid.

References Cited

UNITED STATES PATENTS

| | | | |
|---|---|---|---|
| 1,827,638 | 8/1932 | Hechenbleikner | 23—162 |
| 2,018,249 | 10/1935 | Caro et al. | 23—162 |
| 3,063,804 | 11/1962 | Morrow | 23—162 |
| 3,070,425 | 12/1962 | Grossmann | 23—162 X |
| 3,136,602 | 6/1964 | Berger | 23—162 |

FOREIGN PATENTS 466,160 6/1950 Canada.

OSCAR R. VERTIZ, *Primary Examiner.*

B. H. LEVENSON, *Assistant Examiner.*

U.S. Cl. X.R.

23—157